July 11, 1967   L. SCHWARTZ ETAL   3,330,397
SELECTIVE DEVICE WHICH PRINTS ON PRESSURE SENSITIVE PAPER
Filed July 12, 1965   3 Sheets-Sheet 1
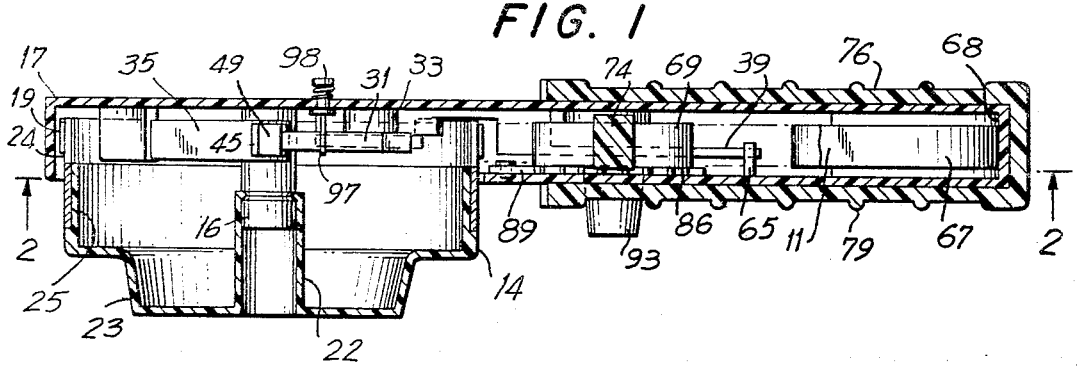
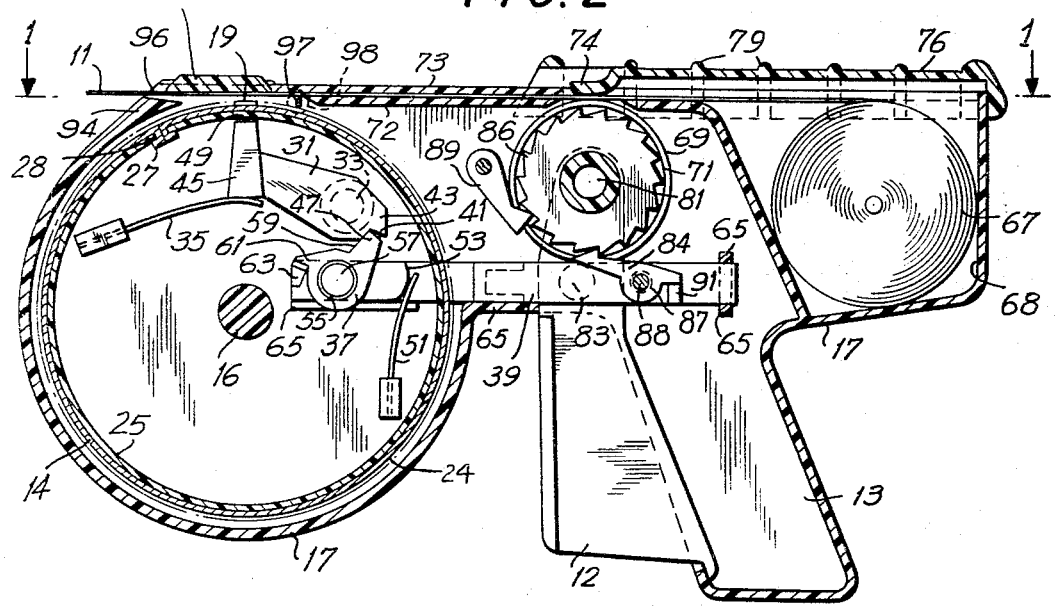
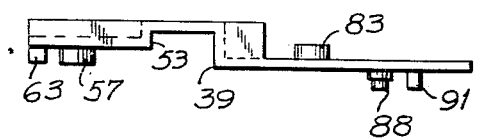
INVENTORS
L. SCHWARTZ &
A. RADCLIFF
BY
ATTORNEY

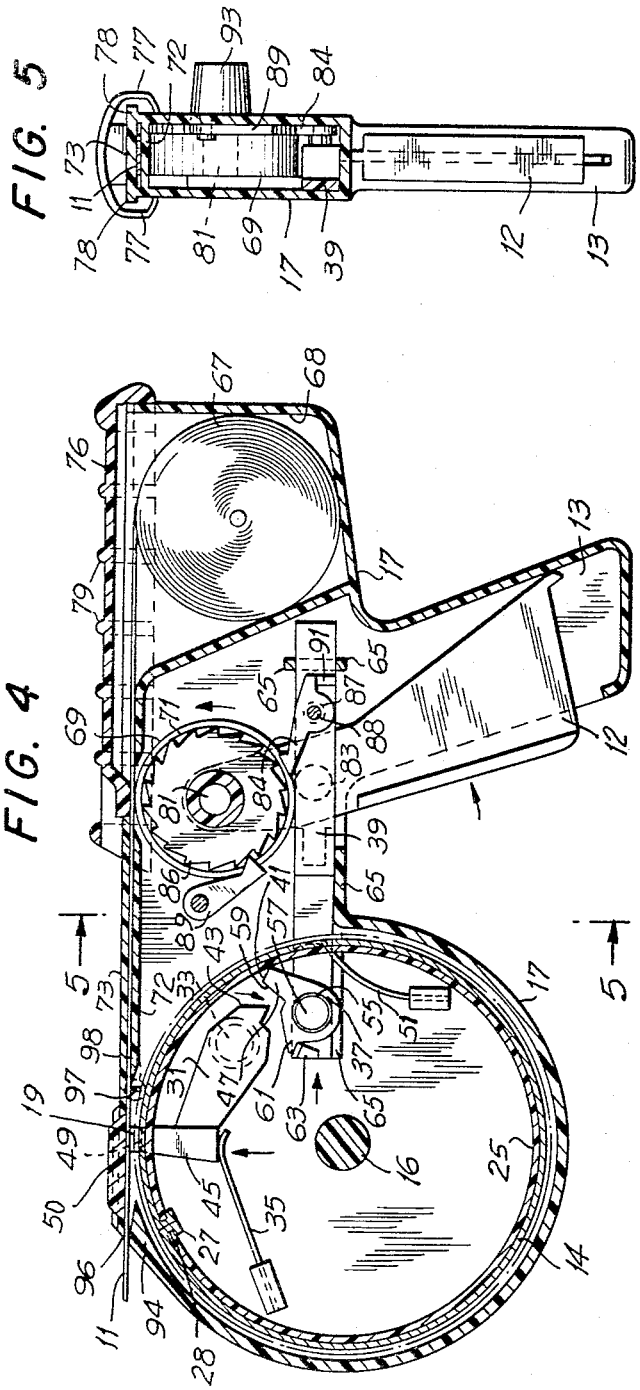
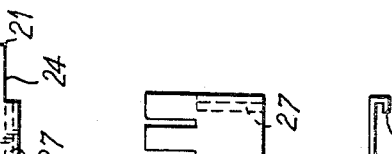
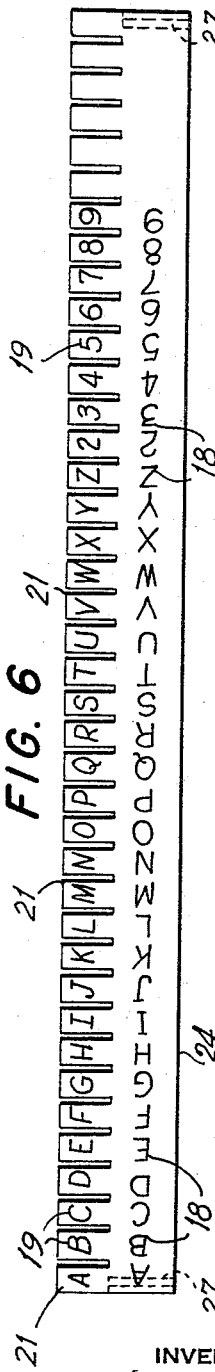

INVENTORS
L. SCHWARTZ AND
A. RADCLIFF
BY
Abner Shyfer
ATTORNEY

United States Patent Office 3,330,397
Patented July 11, 1967

3,330,397
SELECTIVE DEVICE WHICH PRINTS ON PRESSURE SENSITIVE PAPER
Laskar Schwartz, 1 Dogwood Drive, Great Neck, N.Y. 11024, and Alan Radcliff, 6901 SW. 75 Terrace, South Miami, Fla. 33143
Filed July 12, 1965, Ser. No. 471,356
17 Claims. (Cl. 197—6.7)

This invention relates to a novel educational device and to a new device for making printed tapes.

It is an object of this invention to provide a new and improved eductional device.

Another object of this invention is the provision of a novel machine for producing printed labels in tape form for attachment to any desired article.

Other objects of this invention will be apparent from the following detailed description and claims.

In accordance with one aspect of this invention, there is provided a new educational device which, like a pistol, has a handle and a trigger. Unlike a pistol, it prints symbols, pictures, letters, numbers, words, etc. on a roll of paper. A child using the device can, regardless of his writing ability, reproduce with instant response and verification what he sees in front of him. The device is much simpler in construction and operation than a typewriter and is also much less expensive.

One important feature of the device is its use of a tape of pressure-responsive paper. Paper of this type, which is well known commercially, is generally unaffected by ordinary pressures but when subjected locally to pressures above about 70 p.s.i. it turns color, usually because of the rupture of microcapsules, containing a dye or dye-forming material, which microcapsules are present within, or on, the paper. For example, one type of paper sold by National Cash Register Company as "self-contained paper" carries a colorless "dye" and a component which cause the color of the dye to change to blue when in contact with the dye, these two materials being kept separate, by encapsulation, and being brought into contact by breaking of the encapsulating material under high localized pressure. Another commercial product of the same general type is Action Paper sold by the 3M Corporation.

In accordance with one feature of the invention, the device has a set of imprinting elements, and the desired characters are printed on the tape by bringing the tape into proximity to the face of a selected imprinting element and striking the back of the imprinting element with a hammer. The device is preferably so constructed that the resulting printed character is visible on the opposite face of the tape, that is, the face which is not in contact with the imprinting element. Accordingly, the raised portions of the imprinting elements are preferably not, as in ordinary printing or typing, mirror images of the actual characters; they have instead the same shape and arrangement as the desired characters.

In a preferred form the imprinting elements are arranged on the circumference of a circle, or drum, which may be rotated by the child to bring the selected imprinting element directly over the hammer and under the tape, the tape being positioned approximately tangent to the circumference of the circle. The actual striking is accomplished by a trip hammer device actuated by the trigger. With this construction, each hammer blow is given with substantially the same force, thus making for uniform printing. Such uniform printing is attained even when the mechanical arrangement and design of the trigger and hammer-actuating elements is such that they will respond to the small force exerted by a very young child. The character drum, on which the imprinting elements are arranged, is advantageously mounted in easily accessible, and readily removable and replaceable manner. Instead of the simple letters of the alphabet, there may be used pictures, symbols, numbers, words, etc. In one form of the production, assembly of the character drums is facilitated by using a flexible strip of material carrying the imprinting elements, which strip may be molded directly of a suitable plastic, and then attaching the strip around the periphery of the drum. The construction of the drum can thus be standardized and a series of different character strips can be molded, for attachment to a single predetermined type of drum structure.

The preferred device is so constructed that the user can immediately observe the printed character on the tape immediately after the printing has been effected. This, we have found, greatly enhances the utility of the device and its educational value. In one preferred form, highly economical in construction, this is accomplished by providing a transparent anvil to support the tape while its other side is being struck by the hammer-driven imprinting element. Because of the nature of the tape, previously discussed, the printed character will thus be visible directly, not as a mirror image, through the anvil. In another form, requiring a more complicated construction, there is used a retractible anvil which automatically moves to operative position, shielding the tape, when the trigger is operated, and then automatically retracts, revealing the printed character just formed on the tape.

The tape may be a simple strip of the pressure sensitive paper, of such width as to accommodate a single line of character (e.g. on the order about 3/8 inch in width). It may carry a backing of moisture-sensitive adhesive (preferably of the known substantially odorless, invisible and non-toxic type) to enable the printed tape to be pasted readily onto a suitable backing. Thus a child using the device may paste the printed strips he has produced into a workbook or onto pages or cards to make his own dictionary, story books, flash cards, etc. Since one character drum may be readily substituted for another, the child, by the use of drums carrying pictures as their characters, can produce illustrations which can be pasted where he feels appropriate, in the resulting books or cards.

The tape may also be employed for the labelling of various articles, such as tools, implements, pieces of furniture, books, etc. To this end the tape may carry a layer of pressure-sensitive adhesive, which is protected during the printing operation by a layer of shielding material, such as a strippable backing of brown oiled paper. This multilayer tape is advantageously so wound on the tape spool that the adhesive and backing are on the underside of the tape; that is, on the side which is adapted to be engaged by the imprinting element. Such a construction does not interfere with the feature of immediate visibility of the printed character, previously described. For labels which are to be exposed to the weather, the paper is advantageously encased in a thin coating or lamination (e.g. of clear flexible weatherproof plastic material such as cellulose acetate or ethyl cellulose or vinyl chloride-vinyl acetate copolymer) which covers the topside, underside, and edges of the tape in a continuous layer. The pressure-sensitive adhesive and the strippable backing are then applied to the underside of the plastic-encased tape. It will be understood that only the top side and edges may be covered with the continuous plastic layer, and the pressure-sensitive adhesive may then be applied directly to the underside of the paper. It is found that by the use of our device these multilayer constructions may be printed readily to give uniformly printed, highly legible and extremely economical labels.

Some embodiments of the invention are illustrated in the accompanying drawing, in which:

FIGURE 1 is a plan view, mainly in cross-section, of one form of the device taken generally along the line indicated as 1—1 in FIG. 2.

FIGURE 2 is a view in elevation, mainly in cross-section, taken generally along the line 2—2 of FIG. 1.

FIGURE 3 is a plan view of movable actuator bar, which is one element of the device illustrated in FIGS. 1 and 2.

FIGURE 4 is a view like FIG. 1, but showing the trigger in fully retracted position.

FIGURE 5 is a view partly in cross-section, taken along the line 5—5 of FIG. 4.

FIGURE 6 is a plan view of a character strip, carrying the imprinting elements.

FIGURE 7 is a simplified side view of the character strip, showing its end projections, which serve for attaching it to the character drum.

FIGURE 8 is an end view of the character strip showing an imprinting element at the end of one of the fingers of strip.

Figure 9:
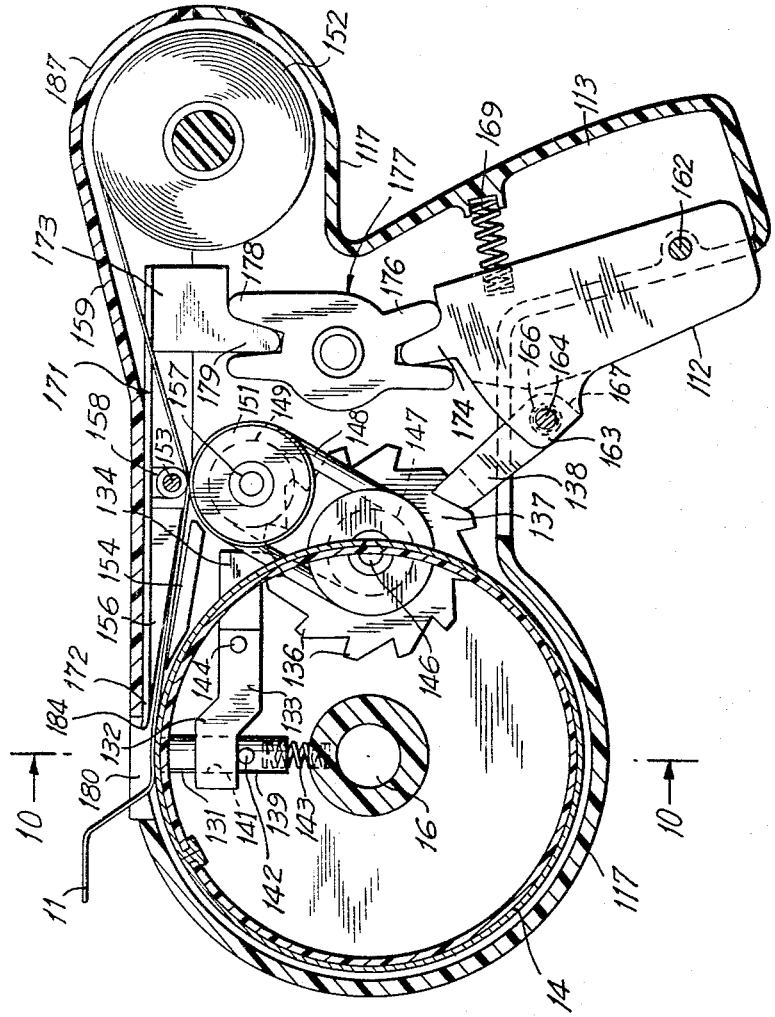
FIGURE 9 is a view in elevation, partly in cross-section, showing an embodiment using a retractible anvil.

Turning now to FIG. 1, reference numeral 11 indicates a strip or tape of pressure-responsive paper onto which the desired characters are to be imprinted. In one preferred form of the device the printing is accomplished, as previously stated, by the impacts of raised imprinting elements against one side of the tape in contact with a transparent anvil. The movements of the imprinting elements are effected by a simple manual movement of a trigger 12 (FIG. 2) mounted on a handle 13. Manual movement of the trigger also serves to advance the tape through the device.

The imprinting elements are situated on a character drum 14 which is mounted for rotation on a stationary pin 16 formed integral with the main body 17 of the housing of the device. Visible characters 18 are spaced around the periphery of the drum; the corresponding raised imprinting elements 19 are spaced axially of these characters. In a preferred form, the imprinting elements 19 on fingers 21 are separated from each other for individual actuation, and situated along the drum, each finger having its corresponding raised imprinting element facing outwardly of the center of the drum. The drum 14 has a central bushing 22 for receiving the mounting pin 16 on which it is supported; preferably there is a snap fit between the pin 16 and the bushing 22 so that the drum may be removed from the pin and another drum identical in structure but with different imprinting elements or different characters may be snapped onto the pin. The end portion 23 of the drum is advantageously ridged; it serves as a knob for use in manually rotating the drum to place the desired imprinting element in registry with the strip 11 of paper.

In a preferred embodiment, characters 18 and the fingers 21 carrying the imprinting elements 19 are on a separate strip 24 (FIGS. 6 to 8) of thin plastic material (e.g. molded nylon). This strip is of such dimensions as to be capable of being bent substantially into a circle around the main portion 25 (FIGS. 1, 2 and 4) of the drum 14, being attached to that main portion in any suitable maner, as by the engagement of projections 27 (at the ends of the strip 24) in a groove 28 formed in the main portion 25.

To drive the selected imprinting element against the lower face of the paper there is a trip hammer arrangement comprising a hammer 31 pivotally mounted on a pin 33, a leaf spring 35, and a hammer retractor element 37 pivoted to a rectilinearly movable bar 39 actuated by movement of the trigger 12. The retractor element 37 has a cam face 41 for engaging the tail 43 of the hammer 31 to raise that tail, and correspondingly depress the head 45 of the hammer when the bar 39 is moved toward the right in FIG. 2. On further movement of the bar 39 in the same direction, the end of the tail 43 slips past the upper tip 47 of the retractor element 37 (as indicated in FIG. 4), so that the hammer is free to move clockwise (as shown by the arrows in FIG. 4) under the influence of its spring 35, bringing the face 49 of the hammer head 45 sharply against the imprinting finger 21, thus pressing the selected imprinting element against the bottom of the tape 11, which is backed up by the transparent anvil 50. The character thus printed on the tape is immediately visible to the user through the anvil.

In the illustrated embodiment the tape-contacting portion of the anvil, overlying the hammer face 49, is smooth and flat. The spacing between the imprinting element and the tape, and between the tape and the anvil, is a total of less than about 1/16 inch, so that there is very little movement of the imprinting element and tape during the printing operation. The imprinting element moves in a short arc when it is struck by the hammer, to compensate for the resulting change in angle and to insure that the imprinting element strikes flat against the anvil-supported paper tape, the fingers 21 may be molded at a corresponding slight angle to the main portion of the strip 24 so that, when the strip 24 is mounted on the drum, the fingers are along converging lines at a corresponding slight angle to the axis of the drum 14.

On release of the trigger, the bar 39 and retractor element 37 are resiliently returned to their original positions by suitable spring action. Thus in one form of the invention there are provided a return leaf spring 51, having one end anchored to the main body 17 and its free end engaged against suitable shoulder 53 on the bar 39, and a coil spring 55 mounted around the pivot 57 of the retractor element 37 to urge that element in a counter-clockwise direction (as viewed in FIG. 2). When the trigger is released and the bar 39 moves to the left under the influence of the spring 51 the retractor element 37 will, at first, be tipped clockwise, against the action of its spring 55, by the engagement of its face 59 with the tail 43 of the hammer, and will then snap back to the position shown in FIG. 2 after the hammer tail has ridden over the upper tip 47 of the retractor element. To limit the counterclockwise movement of the retractor element 37, and to prevent that element from yielding when it is being moved to the right, it has a shoulder 61 for engaging a stop 63 formed on the bar 39. To support the bar 39 for its rectilinear sliding movement, there are suitable guides 65 formed on the main body 17 of the housing.

Squeezing of the trigger advances the paper tape 11, which is stored on a roll 67 situated in a storage compartment 68 formed in the main body 17 at the rear of the device. The tape passes from the roll 67 over the rubber surface 69 of a rubber-tired drive wheel 71 (driven, in turn, by movement of the trigger, in a manner to be described below), then between guides 72 and 73 formed in the main body 17 and thereafter to a position overlying the hammer head 49 and below the transparent anvil 50 which is integral with, or fixed to, the main body 17. To keep the tape 11 in firm engagement with the rubber surface 69, so that the tape will be advanced frictionally on rotation of the drive wheel, there is an integral pressure finger 74 extending downward from a cover member 76 slidably mounted on the main body 17. The cover 76 has depending inwardly extending sides 77 which fit over outwardly projecting tracks 78 formed at the top of main body 17 so that the cover can be forcibly slid, by pressing the thumb against its projecting ridges 79, to uncover the storage compartment 67 to permit the insertion of a fresh roll of tape when desired, as when the old roll is used up. Contact of the finger 74 with a stop at the right side of the main body prevents complete removal of the cover. On the return of the cover to the left, the tape is engaged smoothly between the finger 74 and the wheel 71 without any crumpling of the tape.

The trigger 12 is pivotally mounted on a pin 81 which also serves as the central support for the rotatable drive wheel 71. This pin 81 is integral with, and projects from, one side wall of the main body 17. Below the drive wheel there is a slot in the trigger to receive a corresponding pin 83 projecting from the slidable bar 39 so that pivotal movement of the trigger moves the bar longitudinally, and vice versa. To drive the wheel 71 there is mounted on the bar 39 a pivoted spring-pressed hook 84 which engages a toothed circumferential edge 86 of the wheel. Thus when the trigger is squeezed, the resulting movement of the bar 39 to the right (as viewed in FIGS. 2 and 4) causes the drive roll 71 to rotate counterclockwise and advance the tape to the left. When the trigger is released, the action of the spring 51 moves the bar 39, and with it the trigger, to the left; during this movement the hook 84 rides over the teeth of the edge 86, the hook being tipped back counterclockwise against the force of its spring 87 which is mounted on the pivot 88 of that hook. A spring-pressed pawl 89 engaging the toothed edge 86 prevents clockwise rotation of the drive wheel and corresponding backward movement of the tape. A stop 91 on the bar 39 limits the movement of the hook 84.

In a preferred embodiment the parts are so dimensioned that initial depression of the trigger moves the tape drive wheel a circumferential distance equal to the span of one tooth of the toothed edge 86 without tripping the hammer 31, but full depression of the trigger trips the hammer without moving the tape drive wheel further. That is, during the initial, partial, depression of the trigger the movement of the tip 47 of the hammer retractor is not sufficient to free the tail 43 of the hammer, so that the hammer head will be merely lowered and then raised (on the return of the trigger) insufficiently to print a character on the tape. On further depression of the trigger the hook 84, carried by the bar 39, will move out of engagement with the toothed edge 86 of the tape driving wheel, so that no further advance of the tape will occur, but the tip 47 will move clear of the tail 43 of the hammer causing the hammer to trip. By partial depression and release of the trigger, the user of the device can make any desired number of blank spaces between the characters printed on the tape. In addition, the tape can be advanced any desired distance rapidly without any printing by turning the tape drive wheel counterclockwise by means of a knob 93 fixed to said wheel, while the pawl 89 and hook 84 click over the teeth of the edge 86.

The transparent anvil 50 is advantageously of sufficient length to display the last two or three characters printed on the tape. The transparency of the anvil makes it possible to observe the last character printed at the very instant of printing, which greatly aids in the interest and educative value of the device and which facilitates immediate detection of errors before additional characters are printed. If desired there may be an indicator line, or lines, drawn partly or completely across the transparent anvil to help a child distinguish between the space for the character just printed and the space for the character previously printed.

In a preferred form there is a tape discharge guide 94 formed in the main body 17 below the discharge end of the anvil to insure smooth exiting of the tape.

When the desired length of printed tape has been formed the user need merely advance the tape, by a series of partial depressions of the trigger (as previously described) or by rotation of the knob until the tape has been brought to a position where the point at which it is to be cut off is just at the exit edge 96 of the anvil. The edge 96 is preferably serrated, so that the user can then merely lift up the expelled portion of the tape and tear it across that edge. Alternatively, or additionally, a knife blade 97 having an external operator such as knob 98 may be supported within the main body 17 just below the end of the lower guide 72; the tape can then be cut at this point by depressing the knob 98 to bring the blade in contact with the tape overlying the blade and then pulling the knob to draw the blade across the tape. To facilitate this cutting action, the guide 73 may have a narrow depression just above the line of action of the blade.

Figure 10:
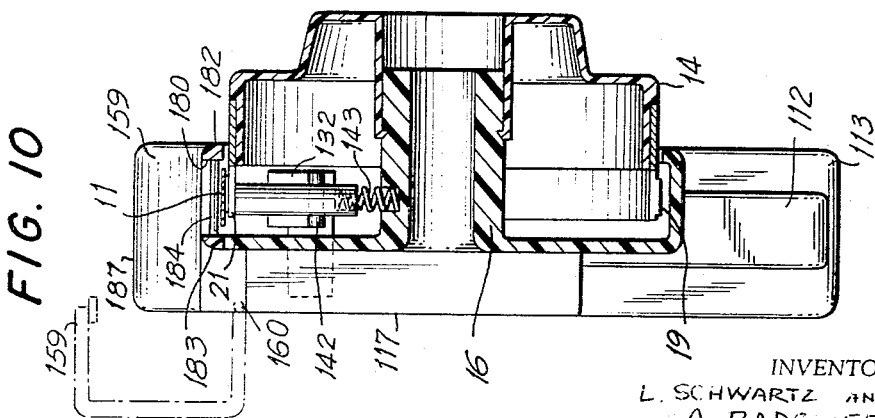
FIGURE 10 is a view in cross-section of the embodiment shown in FIG. 9, taken generally along the line 10—10 of FIG. 9.

In the embodiment shown in FIGS. 9 and 10 the same type of character drum 14, mounted on a pin 16, is employed, but a retractible anvil is used, with a somewhat different trip hammer and tape advancing arrangement. Here the trigger 112 is mounted on a handle 113 of the main body 117, while the hammer 131 is operatively connected to the head end 132 of a pivoted hammer actuator 133 whose tail end 134 engages the teeth 136 of a ratchet 137, which is in turn driven by a pawl 138 attached to the trigger 112. The hammer 131 is conveniently constructed of a hard steel round rod 139 fitted within a slot 141 at the head end of the hammer actuator 133. Running transversely through the rod 139 is a pin 142 for transmitting to the rod 139 the downward hammer-readying motion of the head end of the actuator 133 when the tail end 134 of the actuator is forced upward by the rotation of the ratchet in a counterclockwise direction (when viewed as in FIGS. 9 and 10). Resisting this downward movement of the hammer is a helical spring 143, one end of which is partially pocketed in a recess at the lower end of the rod 139 and the other end of which is disposed against a projection (e.g. pin 16) of the main housing body 117. When, on further counterclockwise rotation of the ratchet 137, a ratchet tooth 136 moves past the tail end 134 of the actuator, permitting downward movement of that tail end, the spring 143 drives the hammer sharply to its upper position against an imprinting finger 21. The pivot of the actuator 133 is a pin 144 fixed to the main housing body 177. The ratchet 137 is mounted for rotation on another pin 146, also fixed to the main body of the housing.

In a preferred form, the ratchet has an integral pulley portion 147 adapted to receive an endless belt 148 which passes around a pulley 149 of a tape drive roller 151 so that rotation of the ratchet also serves to drive the tape.

The tape 11 is stored on a roll 152; on its way from this roll to a position in registry with an imprinting element it passes through the nip formed by the upper part of the drive roller 151 and the lower part of a pressure roller 153 and then between guides 154 and 156. The guides 154 and 156 are formed integrally with the main housing body 117 while the drive roller 151 is rotatably mounted on a pin 157 fixed to that main housing body. The pressure roller 153 is rotatably mounted in a saddle 158 projecting downwardly from a cover 159 which is hinged at 160 (FIG. 10) to one side of the main housing body 117.

To hold the cover 159 in its closed position, there are used any suitable means such as small projections on the cover, adapted to snap into corresponding recesses of the main housing body 117, The cover and the main housing body are both made of stiff plastic material (e.g. molded nylon) which has some resilience, and the parts are so dimensioned that when the cover is closed the pressure roller 153 is pressed tightly towards the drive roller 151, which is preferably formed with a resilient rubber cover.

The pivoted trigger 112 is supported on a pin 162 fixed to the handle 113 which is integral with the main housing body 117. The pawl 138 is supported for limited pivoting movement between two integral ears 163 projecting from the forward end of the trigger, being mounted on a pin 164 passing through said ears. A torsion spring 166 about the pin 164 serves to urge the pawl counterclockwise (as viewed in FIGURE 9) to a position in which its lower end 167 is pressed against a surface of the trigger 112 between the ears 163. Another spring 169, fitted between the trigger 112 and the interior of the handle 113, urges the trigger counterclockwise (as viewed in FIGS. 9 and 10). When the trigger is pivoted manually against the force of the spring, the abutting of the lower end 167 of the pawl against the trigger causes the pawl to act like a rigid extension of the trigger. Thus the pawl, by its engagement between two teeth of the ratchet, serves to move the ratchet counterclockwise during the clockwise movement of the trigger. When the trigger is thereafter released to return to its original position, the pawl tilts clockwise, against the force of its spring, passes over a tooth of the ratchet and snaps into place between that tooth and the adjacent tooth. Each full depression and release of the trigger thus causes the paper to move forward one step and the hammer to make one blow against an imprinting finger.

Movement of the trigger also moves a slidably mounted anvil 171 to bring the operative end 172 of that anvil into a position overlying the hammer 131. The anvil, in a preferred embodiment, is a steel strip firmly secured at its rear end (as by screws, not shown) to an anvil drive block 173 which is driven by the trigger 112 through the engagement of a projection 174 on the trigger with two teeth 176 of toothed rotatable element 177, whose other two teeth 178 engage a lug 179 depending from the anvil drive block 173. Through most of its length the anvil is in slidable engagement with the lower surface of the cover 159, and its forward end (which is laterally offset from its rear end) is also partly in slidable contact with the upper surface of the tape guide 156. The portion of the cover 159 directly overlying the hammer 131 is formed with a slot 180 (FIG. 10) in order to display the printed character directly as it is produced on the paper. The operative end of the anvil 171 is, however, wider than this slot and the edges of anvil here fit in grooves formed between the corresponding side portions 182 and 183 of the cover 159 and the upper part of the main housing body 117. This holds the anvil firmly in place over the tape and hammer 131. It will be understood of course that the side portions 182 and 183 and their grooves may be formed integral with the main body 117, in which case the cover will be shortened accordingly. When the anvil is moved forward into operative position, its extreme forward edge deflects the tape downwardly slightly so that the tape is brought very close to or in contact with an imprinting element 19 and thus is in a position to be affected by the impact of the hammer 131 on the corresponding imprinting finger 21. To avoid possible damage to the tape during this movement of the anvil, the extreme forward edge 184 of the anvil is bent slightly upward, as seen in FIG. 9. On release of the trigger the anvil returns to its retracted position, e.g. under the influence of the trigger spring 169 and the characters formed on the tape are clearly visible in the slot.

To permit the user to advance the tape by the use of the ratchet and the tape drive roller 151 without imprinting it, even when none of the fingers 21 is struck by the hammer, the operative connection between the tape and ratchet may be such that when the trigger is moved for only part of its full stroke and the ratchet thus moves only part of a step, insufficient to move the tail end of the actuator fully past one tooth, the tape will advance and will not retract when the ratchet returns to its original position. This may be accomplished by a suitable conventional one-way slip-clutch connection between the tape drive roller 151 and its pulley 149, or between the ratchet 137 and its pulley 147. It will be evident that with such an arrangement the trigger may be operated short of its full stroke repeatedly to advance the tap without tripping the hammer and without making any net change in the position of the ratchet.

When the anvil is in its retracted position, its forward edge 184 also serves as a tearing edge. Thus the user need merely lift up the tape and tear it off across the edge 184.

Loading the device with a fresh roll of tape is a simple matter. The cover is first swung open, the empty spool is removed from the tape chamber of the main body and is replaced by a full spool. The free end of the new spool is then threaded between the tape guides 154 and 156. Because of the lateral offset of the anvil 171, its presence does not interfere with the threading of the tape. The cover is then closed to bring the pressure roller into contact with the tape. The curved rear upper portion 187 of the cover 159 helps to keep the spool from moving forward.

The housing (including the main body 17 or 117 and cover 76 or 159), and the drum 14, strip 24, trigger 12 or 112 and the other elements of the device are advantageously made of tough molded plastic such as nylon (e.g. clear nylon for the anvil 50). A polyoxymethylene or oxymethylene copolymer or ABS (acrylonitrile-butadiene-styrene) plastic, or other suitable plastic, may be used instead of nylon.

Each character 18 may be arranged adjacent to its corresponding imprinting element 19. It is also possible to have the sequence of characters and imprinting elements out of phase on the drum 14 as by positioning each character so it is displaced by fixed circumferential distance from its corresponding imprinting element and providing a similarly displaced, readily visible character reference indicator (e.g. a reference or arrow marked on the main body 17 adjacent to the drum).

The plastic material of which the strip 24 is molded is sufficiently strong and of sufficient thickness that the fingers 21 will resiliently return to their original positions each time they are deflected by an impact of the hammer. As previously mentioned the fingers may be so formed that their normal resting position is at a slight angle to the plane of the hammer face (and the parallel plane of the anvil face), the angle being such that the end of the finger to be struck is normally closer to the hammer face than is the base of the finger; the impact of the hammer then moves the finger, in an arc, into substantially parallel relation with the anvil face.

Various other modifications and varied applications of the novel features of the application in the detailed description above will occur to those skilled in the art, and consequently this invention should be construed broadly in accordance with its full spirit and scope.

What is claimed is:

1. A printing member carrying a series of individual character-imprinting elements arranged circumferentially on said member, said member having a main body adapted to be movably mounted so as to bring, on its movement, preselected imprinting elements of said series into operative printing positions, said character-imprinting elements being supported on individual projecting resilient fingers integrally connected at their bases, said interconnected fingers and imprinting elements being integrally molded as a substantially flat and rectangular strip separate from said main body, said member having means for attaching said strip to said main body, said main body being a rotatable wheel and said strip being molded of resilient flexible plastic material, said strip being bent around the circumference of said wheel with said fingers projecting substantially parallel to the axis of said wheel and projecting from one long side of the rectangular strip.

2. A printing member as set forth in claim 1 in which said strip carries visible printed characters corresponding to, and aligned with, said imprinting elements.

3. A printing member as set forth in claim 1 in which said imprinting elements face outwardly of said printing member.

4. A device for the production of printed tapes comprising a housing, a roll of pressure-responsive tape carried by said housing, the construction of said tape being such that it changes color in localized areas in response to application of high pressures to said localized areas, an anvil, means for advancing said tape past said anvil, a series of imprinting elements operatively connected and movably mounted for the positioning of a selected imprinting element in an operative position opposite said anvil with said tape between said anvil and the selected imprinting element, and means for urging toward the anvil the imprinting element which is in said operative position, to print onto said tape, by the pressure of said imprinting element on said tape, a character corresponding to said imprinting element, said imprinting elements being situated on a series of fingers movable in an endless path about an axis substantially parallel to the portions of said fingers carrying said imprinting elements, at least said portions being parallel to said axis, each such portion, when its imprinting element is in its operative position, being substantially parallel to the adjacent tape, said urging means moving said imprinting element in a direction perpendicular to said axis during said printing.

5. A device as set forth in claim 4, said housing having a depending pistol grip handle and a pivotally mounted trigger in said handle and operable by squeezing said handle to depress said trigger, said trigger being manually movable from its rest position, said advancing means being connected to said trigger and said urging means to advance said tape and operate said urging means on movement of said trigger.

6. A device as set forth in claim 4 in which said fingers are supported on a rotatable wheel and extend in a direction parallel to the axis of said wheel, said wheel having visible characters to indicate which imprinting element is in its operative position, said urging means comprising a hammer mounted to strike the side of a finger opposite to the side carrying an imprinting element.

7. A device as set forth in claim 6 in which said fingers are joined at their bases in the form of an initially flat molded resilient, flexible plastic strip bent around the circumference of said wheel.

8. A device for the production of printed tapes comprising a housing, a supply of pressure-responsive tape carried by said housing, the construction of said tape being such that it changes color in localized areas in response to application of high pressures to said localized areas, an anvil, said tape being arranged to be advanced past said anvil, a series of imprinting elements operatively connected and movably mounted for the positioning of a selected imprinting element in an operative position opposite said anvil with said tape between said anvil and the selected imprinting element, actuating means, operation of said actuating means first causing an advance of said tape and then causing the imprinting element which is in operative position to be urged toward the anvil to print onto said tape, by the pressure of said imprinting element on said tape, a character corresponding to said imprinting element, said imprinting element being mounted for engaging one side of the tape, said housing having a window at the imprinting position for viewing the opposite side of that portion of the tape which is engaged by the imprinting element whereby the character formed by the pressure of said imprinting element is substantially immediately visible through said window at the imprinting position and before the tape is advanced, the construction and arrangement being such that said anvil does not block the view through said window directly after said impact.

9. A device as set forth in claim 8 wherein the anvil is of transparent plastic having a smooth flat surface for engaging said opposite side of that portion of tape which is engaged by the imprinting element.

10. A device as in claim 8, said series of imprinting elements being mounted for said selective positioning movement independently of said anvil and said anvil being constructed and arranged to be engaged during imprinting by said portion of the tape independently of the selection of a particular imprinting element whereby the same anvil serves for the imprinting of a series of characters.

11. A device as in claim 10, said anvil having a smooth surfaced zone engaged, during imprinting, by said portion of the tape, the position of each selected imprinting element of said series of elements during imprinting being aligned with said zone whereby the same zone of said anvil serves for the imprinting of a series of successive characters, the imprinting configuration of each of said series of imprinting elements being the same, non-mirror image, configuration as the configuration of the corresponding window-visible character formed thereby on the tape, said tape comprising a paper tape having microcapsules containing a material which changes the color of the paper when said microcapsules are ruptured locally by said pressure.

12. A device for the production of printed tapes comprising a housing, a supply of pressure-responsive tape carried by said housing, the construction of said tape being such that it changes color in localized areas in response to application of high pressures to said localized areas, an anvil, means for advancing said tape past said anvil, a series of imprinting elements operatively connected and movably mounted for the positioning of a selected imprinting element in an operative position opposite said anvil with said tape between said anvil and the selected imprinting element, means for urging toward the anvil the imprinting element which is in said operative position, to print onto said tape, by the pressure of said imprinting element on said tape, a character corresponding to said imprinting element, said imprinting element being mounted for engaging one side of the tape, said housing having a window for viewing the opposite side of that portion of tape which is engaged by the imprinting element whereby the character formed by the pressure of said imprinting element is substantially immediately visible through said window, the construction and arrangement being such that said anvil does not block the view through said window directly after said impact, said anvil being of transparent plastic having a smooth flat surface for engaging said opposite side of that portion of tape which is engaged by the imprinting element, said transparent plastic anvil being integral with said housing and said window comprising said anvil, said tape comprising a paper tape having microcapsules containing a material which changes the color of the paper when said microcapsules are ruptured locally by said pressure.

13. A device for the production of printed tapes comprising a housing, a roll of pressure-responsive tape carried by said housing, the construction of said tape being such that it changes color in localized areas in response to application of high pressures to said localized areas, an anvil, means for advancing said tape past said anvil, a series of imprinting elements operatively connected and movably mounted for the positioning of a selected imprinting element in an operative position opposite said anvil with said tape between said anvil and the selected imprinting element, and means for urging toward the anvil the imprinting element which is in said operative position, to print onto said tape, by the pressure of said imprinting element on said tape, a character corresponding to said imprinting element, said imprinting elements being mounted on a series of fingers supported on a rotatable wheel and extending in a direction parallel to the axis of said wheel, said wheel having visible characters to indicate which imprinting element is in its operative position, said urging means comprising a hammer mounted to strike the side of a finger opposite to the side carrying an imprinting element, said fingers being joined at their bases in the form of an initially flat molded resilient, flexible plastic strip bent around the circumference of said wheel, means for detachably securing said strip to said wheel with said imprinting elements facing outwardly, said hammer being mounted within the periphery of said bent strip for outward movement, radially of said wheel, against the inner sides of said fingers.

14. A device for the production of printed tape, comprising an anvil, means for feeding a pressure-responsive tape past said anvil, said anvil being transparent and said tape being visible through said anvil, a series of imprinting elements operatively connected and movably mounted for the positioning of a selected imprinting element in an operative position opposite said anvil with said tape between said anvil and the selected imprinting element, a hammer positioned to drive said imprinting element directly into contact with the tape to press said tape against said anvil to thereby print a character corresponding to said imprinting element onto said pressure-responsive tape, said printed character being visible, immediately on its production, through said transparent anvil, the construction of said tape being such that it changes color in localized areas in response to application of localized high pressures, by an imprinting element, the change in color being directly visible at the sade of the tape opposite to the side engaged by the imprinting element, said series of imprinting elements being mounted for said selective positioning movement independently of said anvil, said anvil having a smooth-surfaced zone engaged by said tape during imprinting, the position of each selected imprinting element of said series of elements during imprinting being aligned with said zone whereby the same zone of said anvil serves for the imprinting of a series of successive characters, the imprinting configuration of each of said series of imprinting elements being the same, non-mirror image, configuration as the configuration of the corresponding desired character formed thereby on the tape and visible through said anvil.

15. A hand-held device for the production of printed tape, comprising a housing carrying a roll of flat paper tape, said tape having microcapsules containing a material which changes the color of the paper when said microcapsules are ruptured by localized pressure, an anvil having a smooth-surfaced zone for contact with one side of said tape, a series of imprinting elements operatively connected and movably mounted for the positioning of a selected imprinting element in an operative position close to said tape and opposite said zone to form an assembly in which the tape is between said zone and the selected imprinting element, a hammer for striking said assembly to force the selected imprinting element and zone toward each other and print the selected character on said tape in the plane of said flat tape, by rupture of said microcapsules, resilient means urging the hammer towards the assembly, means for moving the hammer away from the assembly and for then releasing the hammer for free movement toward said assembly under the force of the resilient means, means for advancing the tape longitudinally past said zone, said series of imprinting elements being movable independently of said zone whereby a single zone serves for the imprinting of a series of successive characters on said tape as said tape advances past said zone, and a manually operated movable member so connected to said hammer moving means and said tape advancing means that the tape is advanced longitudinally with each imprinting stroke of the hammer, whereby a flat printed tape having a lengthwise series of single characters is produced.

16. A device for the production of printed tapes comprising a housing, a supply of pressure-responsive tape carried by said housing, the construction of said tape being such that it changes color in localized areas in response to application of high pressures to said localized areas, an anvil, means for advancing said tape past said anvil, a series of imprinting elements operatively connected and movably mounted for the positioning of a selected imprinting element in an operative position opposite said anvil with said tape between said anvil and the selected imprinting element, means for urging toward the anvil the imprinting element which is in said operative position, to print onto said tape, by the pressure of said imprinting element on said tape, a character corresponding to said imprinting element, said imprinting element being mounted for engaging one side of the tape, said housing having a window for viewing the side of the tape directly opposite to the side engaged by the imprinting element whereby the character formed by the pressure of said imprinting element is substantially immediately visible through said window, the construction and arrangement being such that said anvil does not block the view through said window directly after said impact, said device including an anvil movable from an inoperative position to an operative position, means for feeding said pressure-sensitive tape to a location adjacent to said operative position of said anvil and means for retracting said anvil to its inoperative position atfer said impact.

17. A device for the production of printed tape, comprising a housing carrying a roll of flat paper tape, said tape having microcapsules containing a material which changes the color of the paper when said microcapsules are ruptured by localized pressure, an anvil having a smooth-surfaced zone for contact with one side of said tape, a series of imprinting elements operatively connected and movably mounted for the positioning of a selected imprinting element in an operative position close to said tape and opposite said zone to form an assembly in which the tape is between said zone and the selected imprinting element, a hammer for striking said assembly to force the selected imprinting element and zone toward each other and print the selected character on said tape in the plane of said flat tape, by rupture of said microcapsules, resilient means urging the hammer towards the assembly, means for moving the hammer away from the assembly and for then releasing the hammer for free movement toward said assembly under the force of the resilient means, means for advancing the tape longitudinally past said zone, said series of imprinting elements being movable independently of said zone whereby a single zone serves for the imprinting of a series of successive characters on said tape as said tape advances past said zone.

References Cited
UNITED STATES PATENTS

| | | | |
|---|---|---|---|
| 936,497 | 10/1909 | Webster | 88—24 |
| 2,208,050 | 7/1940 | Pasinski | 101—93 |
| 2,330,799 | 10/1943 | Coker et al. | 88—24 |
| 2,800,457 | 7/1957 | Green et al. | 117—122 X |
| 2,979,179 | 4/1961 | Anglim et al. | 197—6.7 |
| 2,996,822 | 8/1961 | Souza | 196—6.7 |
| 3,083,807 | 4/1963 | Travaglio | 197—6.7 |
| 3,129,800 | 4/1964 | Borgeaus | 197—6.7 |
| 3,133,495 | 5/1964 | DeMan | 197—6.7 X |
| 3,155,215 | 11/1964 | Avery | 197—6.7 |
| 3,181,679 | 5/1965 | Stubbman | 197—6.7 |

OTHER REFERENCES

Dymo Tool and Tape Catalog No. 37, published by Dymo Industries, Form No. 37 (Rev. 2), 1964.

ROBERT E. PULFREY, *Primary Examiner.*

E. S. BURR, *Assistant Examiner.*